(12) United States Patent
Neufeld et al.

(10) Patent No.: US 9,203,527 B2
(45) Date of Patent: Dec. 1, 2015

(54) SHARING A DESIGNATED AUDIO SIGNAL

(71) Applicant: QNX Software Systems Limited, Kanata (CA)

(72) Inventors: Leona Arlene Neufeld, Vancouver (CA); Phillip Alan Hetherington, Port Moody (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 284 days.

(21) Appl. No.: 13/834,014

(22) Filed: Mar. 15, 2013

(65) Prior Publication Data

US 2014/0270251 A1 Sep. 18, 2014

(51) Int. Cl.
*H04B 15/00* (2006.01)
*H04M 9/08* (2006.01)

(52) U.S. Cl.
CPC *H04B 15/00* (2013.01); *H04M 9/08* (2013.01)

(58) Field of Classification Search
None
See application file for complete search history.

(56) References Cited

U.S. PATENT DOCUMENTS 6,160,886 A * 12/2000 Romesburg et al. ..... 379/406.05
8,077,857 B1 12/2011 Lambert
8,175,260 B2 * 5/2012 Normile et al. .......... 379/406.08
2002/0039414 A1 * 4/2002 Nakai et al. .............. 379/406.01
2005/0094580 A1 * 5/2005 Kumar et al. ................. 370/260
2005/0254663 A1 11/2005 Raptopoulos et al.

OTHER PUBLICATIONS

European Search Report for corresponding European Application EP 13 159 435.0, dated Aug. 27, 2013, pp. 1-5.

* cited by examiner

*Primary Examiner* — Thang Tran
(74) *Attorney, Agent, or Firm* — Brinks Gilson & Lione

(57) ABSTRACT

A system and method for sharing a designated audio signal may reproduce the designated audio signal via transducer into an acoustic space. The designated audio signal may be a recorded audio signal, an encoded audio signal, a streamed audio signal and an audio signal component of a multi-media content item. An input audio signal may be received representing a sound field in the acoustic space. One or more microphones may receive the input audio signal. A component contributed by the reproduced designated audio signal may be suppressed in the input audio signal. An echo suppressor may suppress the recaptured designated audio signal. The designated audio signal may be mixed with the suppressed input audio signal to generate an uplink audio signal. The designated audio signal mixed with the suppressed input audio signal may not include artifacts caused by the transducer, the microphone and the acoustic space.

15 Claims, 3 Drawing Sheets

SHARING A DESIGNATED AUDIO SIGNAL

BACKGROUND

1. Technical Field

The present disclosure relates to the field of audio mixing in a communications device. In particular, to a system and method for sharing a designated audio signal.

2. Related Art

A communication system may connect multiple computing devices via a communication channel. A typical computing device may contain a microphone and an audio transducer, or speaker, to facilitate communication between users. Many computing devices are capable of operating in a conference phone configuration where the speaker reproduces audio into an acoustic space and the microphone captures audio from the acoustic space. The microphone may capture some of the audio signal reproduced by the speaker that may result in audible distortions including echoes. Signal processing methods applied to the captured microphone signal may reduce the audible distortions.

Many computing devices utilized in a communications system may reproduce more than simply the audio from the communications channel. Local device alert sounds may be mixed with the audio from the communications channels. These locally generated sounds are typically suppressed when the microphone recaptures them. Locally generated sounds and music can be quite distracting to a far end user.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for sharing a designated audio signal may reproduce the designated audio signal via transducer into an acoustic space. The designated audio signal may be a recorded audio signal, an encoded audio signal, a streamed audio signal or an audio signal component of a multi-media content item. An input audio signal may be received representing a sound field in the acoustic space. One or more microphones may receive the input audio signal. A component contributed by the reproduced designated audio signal may be suppressed in the input audio signal. An echo suppressor may suppress the recaptured designated audio signal. The designated audio signal may be mixed with the suppressed input audio signal to generate an uplink audio signal. The designated audio signal mixed with the suppressed input audio signal may not include artifacts introduced by the transducer, the microphone and the acoustic space. The uplink audio signal may be transmitted via a transmitter.

Figure 1:
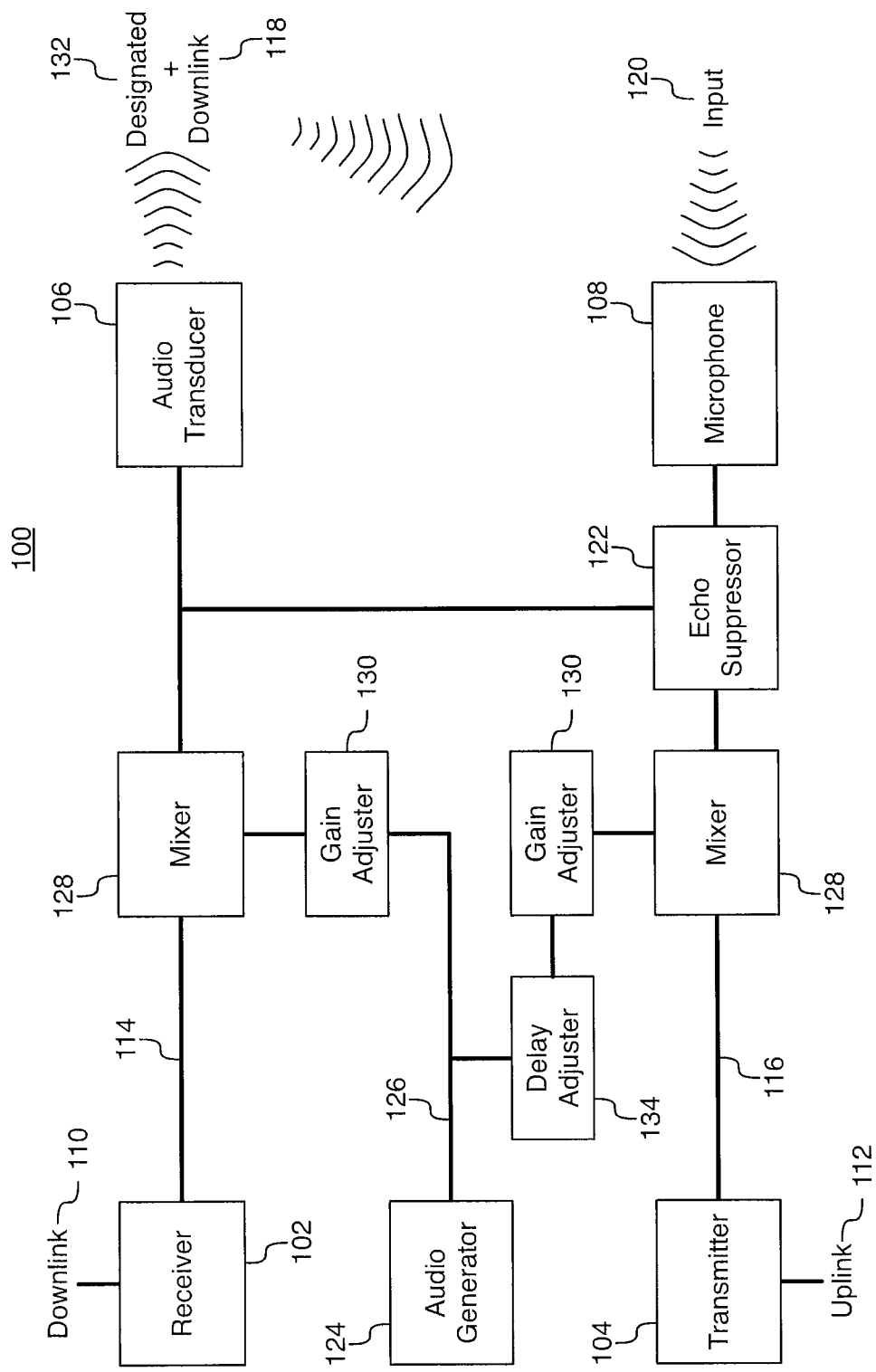
FIG. 1 is a schematic representation of a system for sharing a designated audio signal.

FIG. 1 is a schematic representation of a system for sharing a designated audio signal. The system 100 may include a receiver 102, one or more audio transducers 106, one or more microphones 108, an echo suppressor 122, an audio generator 124, a delay adjuster 134, one or more mixers 128, one or more gain adjusters 130 and a transmitter 104. The system 100 may be part of a hands free communication device or part of a mobile computing device. The receiver 102 may receive a downlink signal 110 via a communications channel that may be wireless or wired. The downlink signal 110 may contain a downlink audio signal 114 and one or more additional signals including video signals and other data. A designated audio signal 126 may be generated utilizing the audio generator 124. The designated audio signal 126 may include any one or more of a recorded audio signal, an encoded audio signal, a streamed audio signal and an audio signal component of a multi-media content item. The designated audio signal 126 may be mixed with the downlink audio signal 114 using mixer 128. The signal level of the designated audio signal 126 may be adjusted with the gain adjuster 130 prior to mixing with the downlink audio signal 126. The combination of the designated audio signal 126 and the downlink audio signal 114 may be reproduced via the audio transducer 106 into an acoustic space.

The one or more microphones 108 may receive an input audio signal 120. The input audio signal 120 may contain both desired signal and undesirable signal components. Desirable signal components may include voice components. Undesirable signal components may include noise; the reproduced designated audio signal 132 and the reproduced downlink audio signal 118. An echo suppressor 122 may suppress the reproduced designated audio signal 132 components and the reproduced downlink audio signal 118 in the input audio signal 120. The echo suppressor 122 may reduce signal gains to suppress echoes. The echo suppressor 122 may also apply echo cancellation that subtracts a predicted echo to mitigate echoes without negatively impacting speech. A mixer 128 may mix the echo suppressed input audio signal and the designated audio signal 126 together to produce an uplink audio signal 116. The uplink audio signal 116 may contain the designated audio signal 126 and the input audio signal 120 where some of the undesirable audible artifacts in the acoustic space may be mitigated. The transmitter 104 may produce an uplink signal 112 that contains the uplink audio signal 116 and one or more additional signals including video signals and other informational data.

One or more gain adjusters 130 may adjust the signal level, or gain, of the designated audio signal 126 reproduced via the transducer 106 and mixed via the mixer 128. Each gain adjuster 130 may adjust the signal level of the designated audio signal 126 independently. For example, a user may control the signal level reproduced via the transducer 106 differently than the signal level of the designated audio signal 126 in the uplink audio signal 116. In another example, an application may control one or more of the signal level adjustments made using the gain adjusters 130.

The designated audio signal 126 shown in FIG. 1 has two paths where one is via the transducer 106 and the other is mixed to create an uplink audio signal 116. The designated audio signal 126 may be delayed between the audio generator 124 and the mixer 128 that creates the uplink audio signal 116. The delay may be introduced by various components including processing delays and buffering delays. For example, the microphone 106 may receive multiple buffers, or blocks, of audio data that introduces buffering delays. A double buffering strategy using two blocks of samples may be used. Each block introduces a fixed amount of delay. The echo suppressor may introduce a processing delay in order to suppress echoes. The delay adjuster 134 introduces a delay to the designated audio signal 126 that is mixed to produce the uplink audio signal 116. The delay adjuster 134 compensates for the various delays, or latencies, so that mixing the designated audio signal 126 to create the uplink audio signal 116 is time aligned with the reproduced designated audio signal 132 included in the input audio signal 120. The delay adjuster 134 may introduce a delay based on a close estimate of the various latencies rather than an exact calculation. The delay adjuster 134 may allow a user, for example, to sing along with a reproduced designated audio track 132 where the uplink audio signal 116 contains the user singing and the designated audio track 126.

Alternatively, the system 100 may reproduce the designated audio signal 126 via the audio transducer 106 into the acoustic space. The receiver 102, the downlink signal 110 and the downlink audio signal 114 may not be utilized. The one or more microphones 108 may receive an input audio signal 120 where the undesirable signal components may include noise and the reproduced designated audio signal 132. The echo suppressor 122 may suppress the reproduced designated audio signal 132 components in the input audio signal 120.

Figure 2:
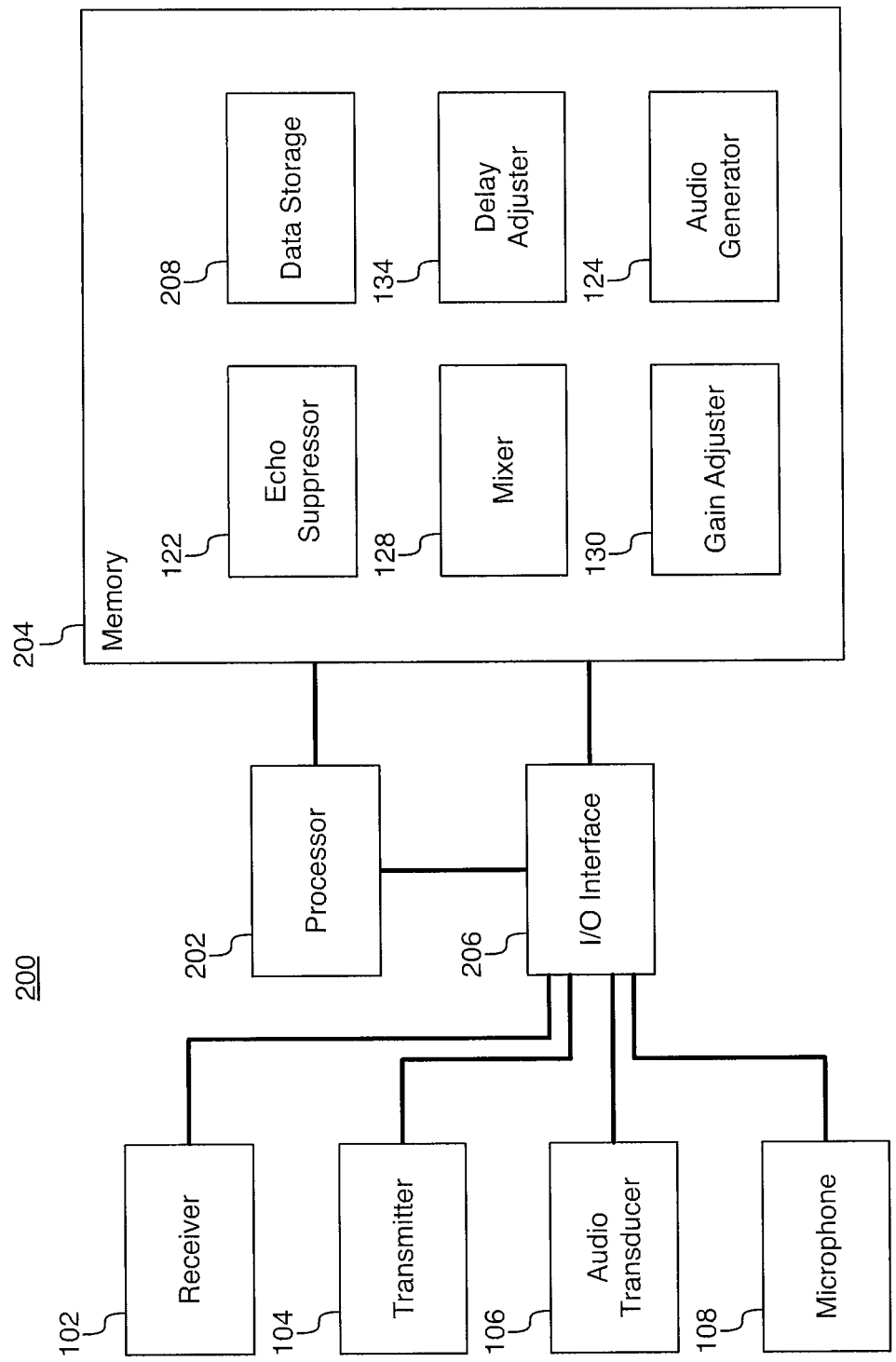
FIG. 2 is a further schematic representation of a system for sharing a designated audio signal.
Figure 3:
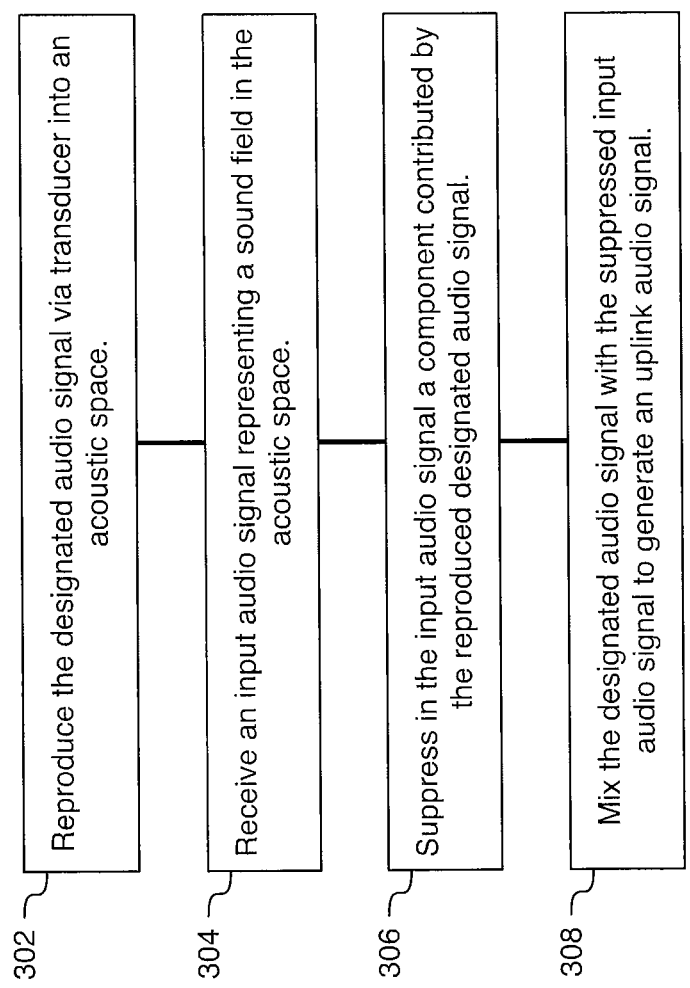
FIG. 3 is flow diagram representing a method for sharing a designated audio signal.

FIG. 3 is a representation of a method for sharing a designated audio signal. The method 300 may be, for example, implemented using the systems 100 and 200 described herein with reference to FIG. 1 and FIG. 2. The method 300 includes the act of reproducing the designated audio signal via transducer into an acoustic space 302. The designated audio signal may be designated based on user input, configuration, operating mode (e.g. which application is executing), or some other type of trigger. The designated audio signal may be any of a recorded audio signal, an encoded audio signal, a streamed audio signal and an audio signal component of a multi-media content item. The designated audio signal may be mixed with another audio signal (e.g. the downlink audio signal) before it is reproduced via the transducer. An input audio signal may be received representing a sound field in the acoustic space 304. One or more microphones may receive the input audio signal. A component contributed by the reproduced designated audio signal may be suppressed in the input audio signal 306. An echo suppressor may suppress the recaptured designated audio signal. The designated audio signal may be mixed with the suppressed input audio signal to generate an uplink audio signal 308. The designated audio signal may have a delayed introduced and be gain adjusted before mixing with the suppressed input audio signal. The designated audio signal mixed with the suppressed input audio signal may not include artifacts introduced by the transducer, the microphone and the acoustic space.

FIG. 2 is a further schematic representation of a system for sharing a designated audio signal. The system 200 comprises a processor 202, memory 204 (the contents of which are accessible by the processor 202) and an I/O interface 206. The memory 204 may store instructions which when executed using the process 202 may cause the system 200 to render the functionality associated with sharing a designated audio signal as described herein. For example, the memory 204 may store instructions which when executed using the processor 202 may cause the system 200 to render the functionality associated with the echo suppressor 122, the mixers 128, the gain adjusters 130, the delay adjuster 134 and the audio generator 124 as described herein. In addition, data structures, temporary variables and other information may store data in data storage 208.

The processor 202 may comprise a single processor or multiple processors that may be disposed on a single chip, on multiple devices or distributed over more that one system. The processor 202 may be hardware that executes computer executable instructions or computer code embodied in the memory 204 or in other memory to perform one or more features of the system. The processor 202 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 204 may comprise a device for storing and retrieving data, processor executable instructions, or any combination thereof. The memory 204 may include non-volatile and/or volatile memory, such as a random access memory (RAM), a read-only memory (ROM), an erasable programmable read-only memory (EPROM), or a flash memory. The memory 204 may comprise a single device or multiple devices that may be disposed on one or more dedicated memory devices or on a processor or other similar device. Alternatively or in addition, the memory 204 may include an optical, magnetic (hard-drive) or any other form of data storage device.

The memory 204 may store computer code, such as the echo suppressor 122, the mixers 128, the gain adjusters 130, the delay adjuster 134 and the audio generator 124 as described herein. The computer code may include instructions executable with the processor 202. The computer code may be written in any computer language, such as C, C++, assembly language, channel program code, and/or any combination of computer languages. The memory 204 may store information in data structures including, for example, filter coefficients, delayed audio samples and state variables.

The I/O interface 206 may be used to connect devices such as, for example, the receiver 102, the transmitter 104, the one or more audio transducers 106, the one or more microphones 108, and to other components of the system 200.

All of the disclosure, regardless of the particular implementation described, is exemplary in nature, rather than limiting. The system 200 may include more, fewer, or different components than illustrated in FIG. 2. Furthermore, each one of the components of system 200 may include more, fewer, or different elements than is illustrated in FIG. 2. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for on-demand user control have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for sharing a designated audio signal comprising:
   reproducing the designated audio signal via a transducer into an acoustic space;
   receiving an input audio signal representing a sound field in the acoustic space;
   suppressing in the input audio signal a component contributed by the reproduced designated audio signal;
   delaying the designated audio signal in time; and
   mixing the delayed designated audio signal with the suppressed input audio signal to generate an uplink audio signal.

2. The method for sharing a designated audio signal of claim 1, where the designated audio signal reproduced via transducer is mixed with a downlink audio signal.

3. A method for sharing a designated audio signal comprising:
   reproducing the designated audio signal via a transducer into an acoustic space;
   receiving an input audio signal representing a sound field in the acoustic space;
   suppressing in the input audio signal a component contributed by the reproduced designated audio signal; and
   mixing the designated audio signal with the suppressed input audio signal to generate an uplink audio signal;
   where the designated audio signal reproduced via transducer is mixed with a downlink audio signal; and
   where the designated audio signal is independently gain adjusted prior to mixing with the downlink audio signal and the suppressed input audio signal.

4. A method for sharing a designated audio signal comprising:
   reproducing the designated audio signal via a transducer into an acoustic space;
   receiving an input audio signal representing a sound field in the acoustic space;
   suppressing in the input audio signal a component contributed by the reproduced designated audio signal; and
   mixing the designated audio signal with the suppressed input audio signal to generate an uplink audio signal;
   where the designated audio signal mixed with the suppressed input audio signal is delayed where the amount of delay time aligns the designated audio signal with the input audio signal.

5. The method for sharing a designated audio signal of claim 1, where the designated audio signal is any of: a recorded audio signal, an encoded audio signal, a streamed audio signal and an audio signal component of a multi-media content item.

6. The method for sharing a designated audio signal of claim 1, where the designated audio signal is designated based on any of: a user input, a configuration and an operating mode.

7. A system for sharing a designated audio signal comprising:
   a transducer to reproduce the designated audio signal into an acoustic space;
   a receiver to receive an input audio signal representing a sound field in the acoustic space;
   a suppressor to suppress a component in the input audio signal contributed by the reproduced designated audio signal;
   a time delay circuit that delays the designated audio signal in time; and
   a mixer to mix the delayed designated audio signal with the suppressed input audio signal to generate an uplink audio signal.

8. The system for sharing a designated audio signal of claim 7, where the designated audio signal reproduced via transducer is mixed using a mixer with a downlink audio signal.

9. A system for sharing a designated audio signal comprising:
   a transducer to reproduce the designated audio signal into an acoustic space;
   a receiver to receive an input audio signal representing a sound field in the acoustic space;
   a suppressor to suppress a component in the input audio signal contributed by the reproduced designated audio signal; and
   a mixer to mix the designated audio signal with the suppressed input audio signal to generate an uplink audio signal;
   where the designated audio signal reproduced via transducer is mixed using a mixer with a downlink audio signal; and
   where the designated audio signal is independently gain adjusted using a gain adjuster prior to mixing with the downlink audio signal and the suppressed input audio signal.

10. A system for sharing a designated audio signal comprising:
    a transducer to reproduce the designated audio signal into an acoustic space;
    a receiver to receive an input audio signal representing a sound field in the acoustic space;
    a suppressor to suppress a component in the input audio signal contributed by the reproduced designated audio signal; and
    a mixer to mix the designated audio signal with the suppressed input audio signal to generate an uplink audio signal;
    where the designated audio signal mixed with the suppressed input audio signal is delayed by a delay adjuster where the amount of delay time aligns the designated audio signal with the input audio signal.

11. The system for sharing a designated audio signal of claim 7, where the designated audio signal is any of: a recorded audio signal, an encoded audio signal, a streamed audio signal and an audio signal component of a multi-media content item.

12. The system for sharing a designated audio signal of claim 7, where the designated audio signal is designated based on any of: a user input, a configuration and an operating mode.

13. The system for sharing a designated audio signal of claim 7, where the suppressor is an echo suppressor.

14. The system for sharing a designated audio signal of claim 7, where the system is part of a hands-free communication device.

15. The system for sharing a designated audio signal of claim 7, where the system is part of a mobile computing device.

* * * * *